United States Patent  (10) Patent No.: US 12,440,219 B2
Wang et al. (45) Date of Patent: Oct. 14, 2025

(54) SCALP CLIP GUN

(71) Applicant: BEIJING HONGHUGAOXIANG TECHNOLOGY DEVELOPMENT CO., LTD, Beijing (CN)

(72) Inventors: Bing Wang, Beijing (CN); Dongliang Guo, Beijing (CN)

(73) Assignee: BEIJING HONGHUGAOXIANG TECHNOLOGY DEVELOPMENT CO., LTD., Beijing (CN)

( * ) Notice: Subject to any disclaimer, the term of this patent is extended or adjusted under 35 U.S.C. 154(b) by 476 days.

(21) Appl. No.: 17/909,017

(22) PCT Filed: Mar. 11, 2021

(86) PCT No.: PCT/CN2021/080158
§ 371 (c)(1),
(2) Date: Sep. 2, 2022

(87) PCT Pub. No.: WO2021/244093
PCT Pub. Date: Dec. 9, 2021

(65) Prior Publication Data
US 2023/0089712 A1 Mar. 23, 2023

(30) Foreign Application Priority Data
Jun. 2, 2020 (CN) .......................... 202010491042.5

(51) Int. Cl.
*A61B 17/128* (2006.01)
*A61B 17/00* (2006.01)

(52) U.S. Cl.
CPC .. *A61B 17/128* (2013.01); *A61B 2017/00367* (2013.01)

(58) Field of Classification Search
CPC ......... A61B 17/128–1285; A61B 2017/00367; A61B 2017/00407; A61B 17/10–105
See application file for complete search history.

(56) References Cited

U.S. PATENT DOCUMENTS 4,671,278 A * 6/1987 Chin .................... A61B 17/128
606/143
2004/0193185 A1* 9/2004 McBrayer .......... A61B 17/1285
606/139
(Continued)

FOREIGN PATENT DOCUMENTS

CN 2503847 Y 8/2002
CN 101843512 A 9/2010
(Continued)

OTHER PUBLICATIONS

International Search Report mailed May 27, 2021.

*Primary Examiner* — Brigid K Byrd
(74) *Attorney, Agent, or Firm* — McClure, Qualey & Rodack, LLP

(57) ABSTRACT

A scalp clip gun, comprising a housing, a magazine, a propulsion mechanism, and a locking mechanism. A positioning protrusion is provided at the front end of the housing. A first end of the magazine is provided with a slot, and the slot is cooperatively connected to the positioning protrusion. The propulsion mechanism comprises a trigger, guide rail, a tension spring, a transmission rack, and a driver. The transmission rack is arranged inside the housing and may slide horizontally relative to the housing. The guide rail is arranged in a through-hole of the driver. The driver may move forward relative to the guide rail. The tail end of the guide rail is fixed by means of the locking mechanism and scalp clips are slidingly arranged on the guide rail. The scalp clip gun may quickly and continuously eject the scalp clips.

10 Claims, 8 Drawing Sheets

(56) References Cited

U.S. PATENT DOCUMENTS

| | | | | |
|---|---|---|---|---|
| 2012/0048759 | A1* | 3/2012 | Disch | A61B 17/1222 |
| | | | | 206/339 |
| 2019/0133584 | A1* | 5/2019 | Baril | A61B 17/1285 |
| 2019/0175189 | A1* | 6/2019 | P V R | A61B 34/30 |

FOREIGN PATENT DOCUMENTS

| | | |
|---|---|---|
| CN | 201759626 U | 3/2011 |
| CN | 102860854 A | 1/2013 |
| CN | 105997168 A | 10/2016 |
| CN | 111671486 A | 9/2020 |

\* cited by examiner

SCALP CLIP GUN

The present application claims priority from the Chinese Patent Application No. CN202010491042.5 filed before the China National Intellectual Property Administration on Jun. 10, 2020 and entitled "Scalp clip gun", the entire content of which is incorporated herein by reference.

TECHNICAL FIELD

Embodiments of the present application relate to the technical field of medical instruments, and in particular to a scalp clip gun.

BACKGROUND ART

Craniotomy refers to opening the skull of a patient with a mechanical device, so as to perform some unconventional treatment. Before opening the skull, it is necessary to cut the scalp. When cutting the scalp, doctors need to stop bleeding of the cut scalp. Generally, scalp clips are used to stop bleeding, and the scalp clip needs to be used in cooperation with the scalp clamp. During a surgical procedure, a doctor takes one scalp clip and uses it, as a result, the operation speed is slow, which makes operation time longer, amount of bleeding increased, and probability of infection increased.

Therefore, there is a need in prior art for a scalp clip gun to solve the above problems.

SUMMARY OF THE INVENTION

To this end, the embodiments of the present application provide a scalp clip gun, which is used to solve the problems in current surgical procedure that a doctor takes one scalp clip and uses it, consequently the speed is slow, which makes operation time longer, amount of bleeding increased, and probability of infection increased.

In order to achieve the above goal, the embodiments of the present application provide the following technical solutions:

A scalp clip gun comprises a housing, a magazine, a propulsion mechanism, and a locking mechanism; a positioning protrusion is provided at a front end of the housing, a first end of the magazine is provided with a slot, the slot is cooperatively connected to the positioning protrusion, a positioning groove is provided at a rear end of the housing, a second end of the magazine is cooperatively connected with the positioning groove, the magazine is provided with an inner cavity that accommodates a plurality of scalp clips, both sides of the magazine are each provided with a latch, and a bottom portion of the magazine is provided with an elongated slot; and the propulsion mechanism comprises a trigger, a guide rail, a tension spring, a transmission rack and a driver; the transmission rack is arranged in the housing and is slidable horizontally relative to the housing, the transmission rack is provided with first transmission gears, a trigger buckle and a rear protrusion, a first end of the trigger is rotatably arranged in the trigger buckle, the driver is arranged at a rear end of the transmission rack, a lower side of the driver is provided with second transmission gears, the first transmission gears engage with the second transmission gears, the guide rail is arranged in a through-hole of the driver, the driver is moveable relative to the guide rail, a left side and a right side of the driver are each provided with a stopping protrusion, both sides of the magazine are provided with a plurality of positioning openings, the stopping protrusions are arranged to clamp and connect with the positioning openings at the magazine, a top portion of the driver is provided with an elastic piece, the elastic piece is used to reset the upwardly forced driver to a position that the transmission rack engages with the driver when the transmission rack moves horizontally rearward; a tail end of the guide rail is fixed by means of the locking mechanism, an upper side and a lower side of the locking mechanism are provided with a first protrusion and a second protrusion that are respectively clampable with the first groove and the second groove at a tail end of the magazine; a first end of the tension spring is connected with the rear protrusion, and a second end of the tension spring is connected with a mounting column in the housing; the scalp clips are slidingly arranged on the guide rail.

In a preferred technical solution of the foregoing scalp clip gun, wherein the housing comprises a first housing and a second housing, the first housing and the second housing are folded to form the housing, and the first housing and the second housing are structurally symmetrical.

In a preferred technical solution of the foregoing scalp clip gun, wherein a first positioning shaft hole and a second positioning shaft hole are provided in the first housing; a first positioning shaft mechanism is installed in the first positioning shaft hole, a second positioning shaft mechanism is installed in the second positioning shaft hole, the transmission rack is provided with a first guide groove and a second guide groove, the first positioning shaft mechanism is arranged in the first guide groove, and the second positioning shaft mechanism is arranged in the second guide groove, so that the transmission rack moves horizontally forward or rearward relative to the first housing.

In a preferred technical solution of the foregoing scalp clip gun, wherein a first end of the guide rail is provided with a bracing part, the bracing part opens the scalp clips that are pushed towards the first end of the guide rail to facilitate subsequent clamping operations; a second end of the guide rail is provided with a locking hole, a main body of the guide rail is of a V-shaped structure, and the locking hole cooperates with a locking column of the locking mechanism to effect fixed connection of the second end of the guide rail.

In a preferred technical solution of the foregoing scalp clip gun, the bracing part is in Y-shaped structure, and one side thereof is inclined upwardly or downwardly.

In a preferred technical solution of the foregoing scalp clip gun, wherein the locking mechanism comprises a first locking block and a second locking block; an upper end of the first locking block is provided with the first protrusion, and the first protrusion corresponds with the first groove at the tail end of the magazine; the second protrusion is arranged at a lower end of the second locking block, and the second protrusion corresponds with the second groove at the tail end of the magazine, so that the locking mechanism is fixable with the second end of the magazine; and a V-shaped protrusion is arranged at a lower end of the first locking block, a V-shaped groove is arranged in an upper end of the second locking block, the V-shaped protrusion is connectable to the V-shaped groove, the locking column is arranged in the V-shaped groove, the locking column is in locking connection with the locking hole at the second end of the guide rail, which effects a fixed connection between the guide rail and the locking mechanism.

In a preferred technical solution of the foregoing scalp clip gun, wherein each of the scalp clips is of an annular cantilever structure, one side of each of the scalp clips is provided with an open slot matched with a shape of a cross section of the guide rail, a notch is provided on an opposite side, and the guide rail sequentially passes through the open slot and the notch but not in contact with the notch, so that the scalp clips are slidable on the guide rail.

In a preferred technical solution of the foregoing scalp clip gun, wherein a first end of the trigger is a trigger head, a second end of the trigger is a trigger tail, the trigger is rotatably fixed on the first housing by a pin shaft arranged between the trigger head and the trigger tail, and the trigger head is inserted into the trigger buckle on the first housing.

In a preferred technical solution of the foregoing scalp clip gun, wherein the trigger buckle is an arc-shaped groove provided with an opening, a first end of the trigger is an arc-shaped protrusion, and pulling the trigger causes the arc-shaped protrusion slides into the arc-shaped groove.

In a preferred technical solution of the foregoing scalp clip gun, wherein the positioning openings on both sides of the magazine are correspondingly arranged, wherein spacings between adjacent positioning openings on the same side are equal, and each of the positioning openings corresponds to each of the scalp clips on the guide rail.

It can be understood by those skilled in the art that, in the preferred technical solution of the scalp clip gun of the present application, the scalp clip gun of the present application can quickly and continuously deliver the scalp clips, and during delivery, the front end of the guide rail is provided with the bracing part, and the sent scalp clips are directly opened, which is convenient for a doctor to clamp, so that the scalp clips are clean, continuous operation efficiency is high, the amount of bleeding is reduced to a certain extent, and probability of infection is reduced; and at the same time, the scalp clips are simple to operate, by holding the handle by a single hand and actuating the trigger by index finger delivery of the scalp clips can be realized, which is convenient for use.

BRIEF DESCRIPTION OF THE DRAWINGS

To clarify the embodiments of the present application or the technical solutions in the prior art more clearly, hereinafter the attached drawings required in the description of the embodiments or the prior art are briefly introduced. Obviously, drawings in the following description are exemplary, and those of ordinary skill in the art can derive and obtain other drawings from these drawings provided herein without creative efforts.

Structures, proportions, and sizes indicated in the description are disclosed for matching the description, so as to be understood and read by those skilled in the art, rather than defining restrictive conditions that the present application can implement, therefore, they have no technically substantive meaning. Any modification of any structure, change in proportional relations, or size adjustment shall fall in the scope covered by the technical content disclosed by the present application without affecting the effect generated by the present application and the purpose achieved by the present application.

Figure 1:
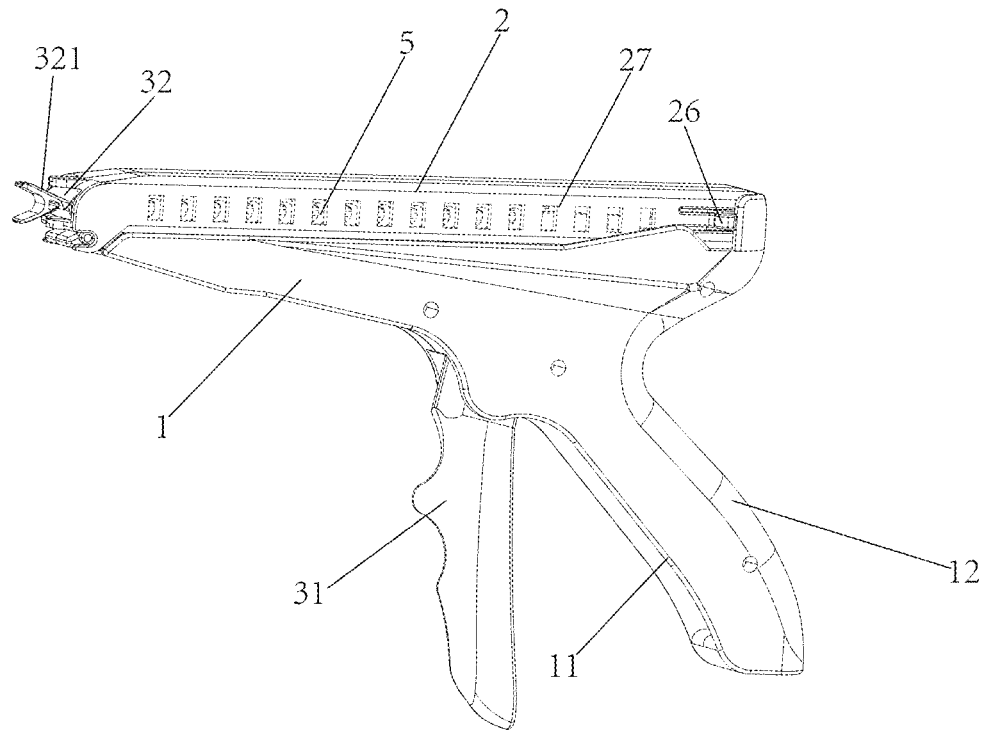
FIG. 1 is a first schematic diagram showing appearance of an embodiment of a scalp clip gun according to the present application.

In the drawings, 1—housing; 11—first housing; 111—positioning protrusion; 112—first positioning shaft hole; 113—second positioning shaft hole; 114—mounting column; 115—pin shaft hole; 12—second housing; 2—magazine; 21—slot; 22—first groove; 23—second groove; 24—elongated slot; 25—inner cavity; 26—latch; 27—positioning opening;

3—propulsion mechanism; 31—trigger; 311—trigger head; 312—trigger tail; 32—guide rail; 321—bracing part; 322—locking hole; 33—tension spring; 34—transmission rack; 341—first guide groove; 342—second guide groove; 343—first transmission gear; 344—trigger buckle; 345—rear protrusion; 35—driver; 351—second transmission gear; 352—stopping protrusion; 353—elastic piece; 354—through-hole;

4—locking mechanism; 41—first locking block; 411—first protrusion; 412—V-shaped protrusion; 42—second locking block; 421—second protrusion; 422—V-shaped groove; 423—locking column; and

5—scalp clip; 51—open slot; and 52—notch.

DETAILED DESCRIPTION

Hereinafter, a detailed description of the preferred embodiments in the present application is given. Those skilled in the art can easily understand other advantages and effects of the present application based on the content in the descriptions. Obviously, the embodiments are only part of rather than all of the embodiments of the present application. Based on the embodiments described in the present application, all other embodiments obtained by those of ordinary skill in the art without creative efforts shall fall within the scope of the present application.

Embodiment 1

An embodiment of the present application provides a scalp clip gun.

Based on the problems indicated in the background art that in current surgical procedures, a doctor takes a scalp clip and uses one, and the speed is slow, which makes operation time longer, amount of bleeding increased, and probability of infection increased. The scalp clip gun of the present application can quickly and continuously deliver the scalp clip, and in delivery processes, the front end of the guide rail is provided with the bracing part, and the sent scalp clip is directly opened, which makes it convenient for a doctor to clamp, so that the scalp clip is clean, continuous operation efficiency is high, the amount of bleeding is reduced to a certain extent, and probability of infection is reduced too; and at the same time, the scalp clip is simple to operate, and by holding the handle by a single hand and actuating the trigger by index finger delivery of the scalp clip can be realized, which is convenient for use.

Specifically, as shown in FIG. 1 to FIG. 14, the scalp clip gun of the present application comprises a housing 1, a magazine 2, a propulsion mechanism 3, and a locking mechanism 4; the housing is in a structure of a gun, a positioning protrusion 111 is provided at a front end of the housing, a first end of the magazine 2 is provided with a slot 21, the slot 21 is cooperatively connected to the positioning protrusion 111, a positioning groove is provided at a rear end of the housing, a second end of the magazine 2 is cooperatively connected with the positioning groove, the magazine 2 is provided with an inner cavity 25 that accommodates a plurality of scalp clips 5, both sides of the magazine 2 are each provided with a latch 26, and a bottom portion of the magazine 2 is provided with an elongated slot; and the propulsion mechanism 3 comprises a trigger 31, a guide rail 32, a tension spring 33, a transmission rack 34 and a driver 35; the transmission rack 34 is arranged in the housing and may slide horizontally relative to the housing, the transmission rack 34 is provided with first transmission gears 343, a trigger buckle 344 and a rear protrusion 345, a first end of the trigger 31 is rotatably arranged in the trigger buckle 344, the driver 35 is arranged at a rear end of the transmission rack 34, a lower side of the driver 35 is provided with second transmission gears 351, the first transmission gears 343 engage with the second transmission gears 351, the guide rail 32 is arranged in a through-hole 354 of the driver, the driver 35 may move forward relative to the guide rail 32, a left side and a right side of the driver 25 are each provided with a stopping protrusion 352, both sides of the magazine 2 are provided with a plurality of positioning openings 27, the stopping protrusions 352 are arranged to clamp and connect with the positioning openings 27 at the magazine 2, a top portion of the driver 35 is provided with an elastic piece 353, the elastic piece 353 is used to reset the upwardly forced driver to an initial position during resetting processes; a tail end of the guide rail 32 is fixed by means of the locking mechanism 4, upper and lower sides of the locking mechanism 4 are provided with a first protrusion 411 and a second protrusion 421 that are respectively clampable with the first groove 22 and the second groove 23 at a tail end of the magazine 2; a first end of the tension spring 33 is connected with the rear protrusion 345, and the second end of the tension spring 33 is connected with a mounting column 114 in the housing; the scalp clips 5 are slidingly arranged on the guide rail 32. The scalp clip gun further comprises a handle and the handle comprises a transverse portion and a vertical portion, wherein the transverse portion and the vertical portion join at an angle of 120° (The angle is 100° in the prior art, in the surgical procedure, the trigger is in a position of the human head and obstructs with the human head, which is not conducive to surgery operation), which is beneficial to the surgical field of view. Preferably, the first end of the magazine 2 is at the front end of the housing 1 and extends forward to make the field of view clearer. In order to make the operation more convenient, the transverse portion and the vertical portion of the handle are arranged to form an angle of 90° (see also FIG. 15).

In the present application, shapes of the slot 21 and the positioning protrusion 111, as well as shapes of the first protrusion 411, the second protrusion 421, the first groove 22 and the second groove 23, can be in any shapes, and changes on their shapes made by those skilled in the art shall be covered within the scope of protection of the present application. The shape of the positioning openings 27 can be trapezoidal or other shapes, such as square. Any changes on the shape of the positioning openings 27 by those skilled in the art shall be covered within the scope of protection of the present application. More preferably, in the present application, each of the positioning openings 27 is in a trapezoidal shape, so that the driver is always at a lower portion, so that the first transmission gears 343 of the transmission rack 34 and the second transmission gears 351 of the driver 35 can be more firmly combined together, and the driver 35 slides to the bottommost portion along the inclined surface all the time.

The first transmission gears 343 and the second transmission gears 351 can be made into other shapes or a single transmission structure. The first transmission gears 343 and the second transmission gears 351 of the present application are special in that inclination directions of all the gears shall promise that during transmission process, the driver has no force away from an engagement direction between the gears and the transmission gears are reliable and stable. When the transmission rack 34 moves forward horizontally, the driver 35 has no upward force. When the driver 35 is in transmission, the driver 35 will exert more force, and the rack will stick to the transmission rack 34 more firmly. When the transmission rack 34 moves horizontally rearward, namely, when the tension spring 33 is reset, the driver 35 is disengaged from the transmission rack 34, and the driver 35 is pushed up to give way. The function of the elastic piece 353 is to reset the driver 35 to the initial position, namely, the position where the first transmission gears 343 of the transmission rack 34 engages with the second transmission gears 351 of the driver 35.

Figure 2:
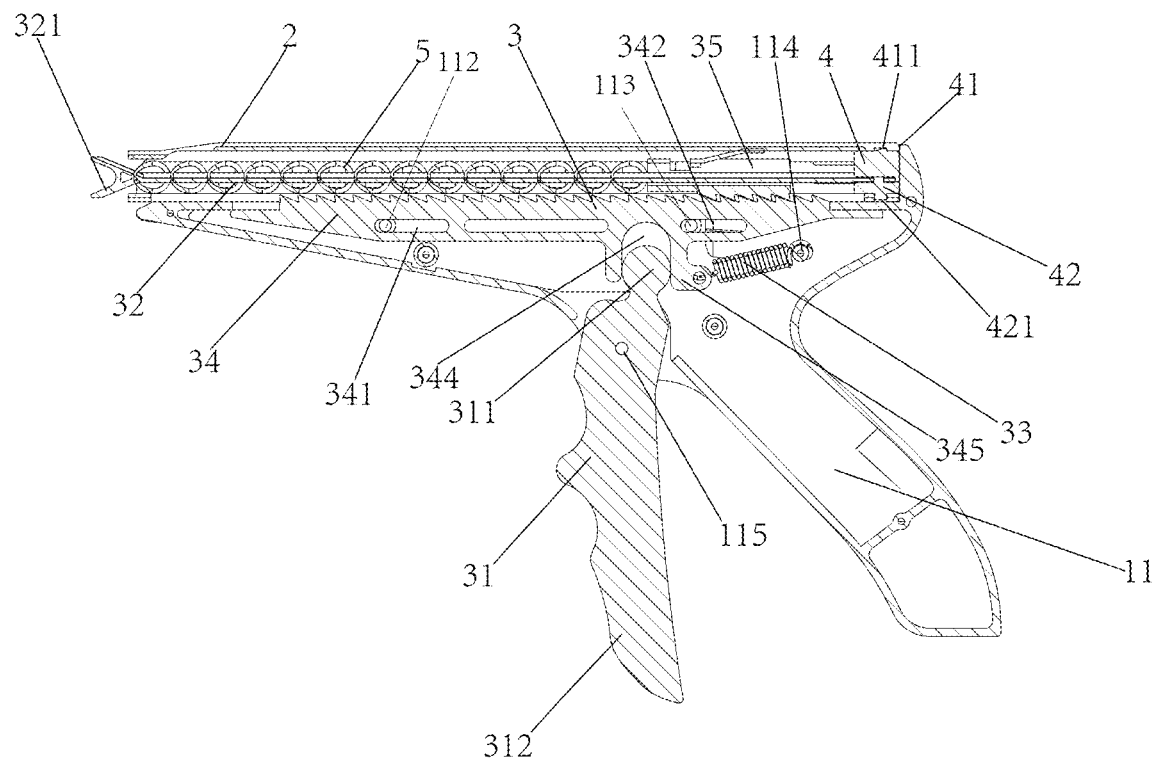
FIG. 2 is an internal schematic diagram of an embodiment of the scalp clip gun according to the present application.

Preferably, as shown in FIG. 1 to FIG. 2, the housing 1 comprises a first housing 11 and a second housing 12, the first housing 11 and the second housing 12 are folded to form the housing 1, and the first housing 11 and the second housing 12 are structurally symmetrical. The holes, grooves, etc. provided in the first housing 11 are correspondingly provided in the corresponding positions of the second housing 12, and no more detail will be provided herein.

Preferably, as shown in FIG. 2, a first positioning shaft hole 112 and a second positioning shaft hole 113 are provided in the first housing 11; a first positioning shaft mechanism is installed in the first positioning shaft hole 112, a second positioning shaft mechanism is installed in the second positioning shaft hole 113, the transmission rack 34 is provided with a first guide groove 341 and a second guide groove 342, the first positioning shaft mechanism is arranged in the first guide groove 341, and the second positioning shaft mechanism is arranged in the second guide groove 342, so that the transmission rack 34 moves horizontally forward or rearward relative to the first housing 11. In the present application, the first positioning shaft mechanism and the second positioning shaft mechanism can be fixed shafts, and can also be fixed shafts provided with bearings.

Figure 5:
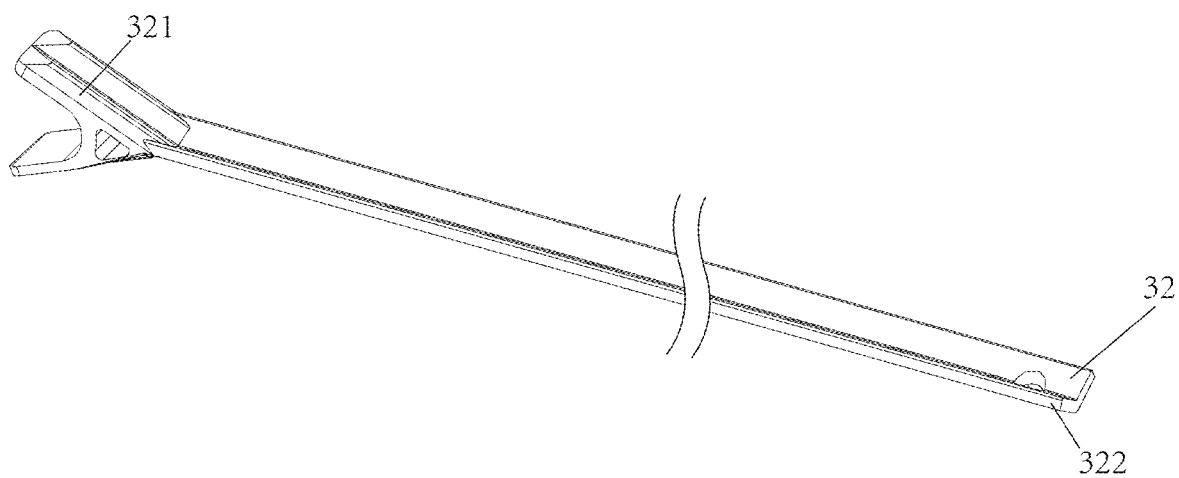
FIG. 5 is a schematic structural diagram of an embodiment of a guide rail according to the present application.
Figure 6:
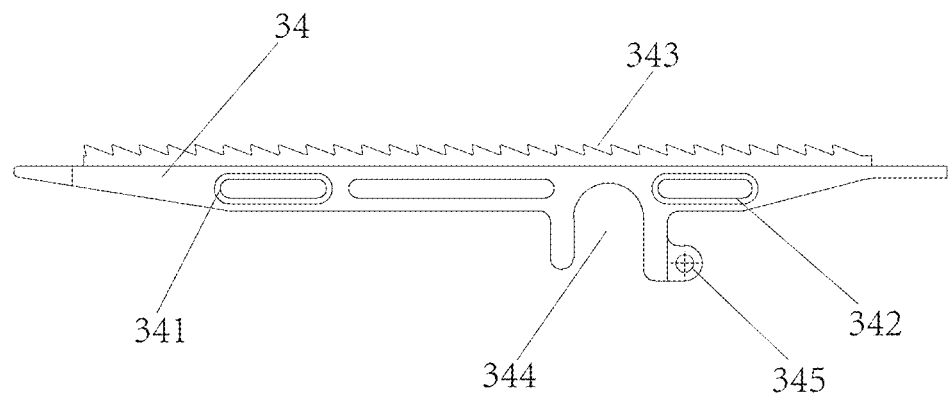
FIG. 6 is a schematic structural diagram of an embodiment of a transmission rack according to the present application.
Figure 7:
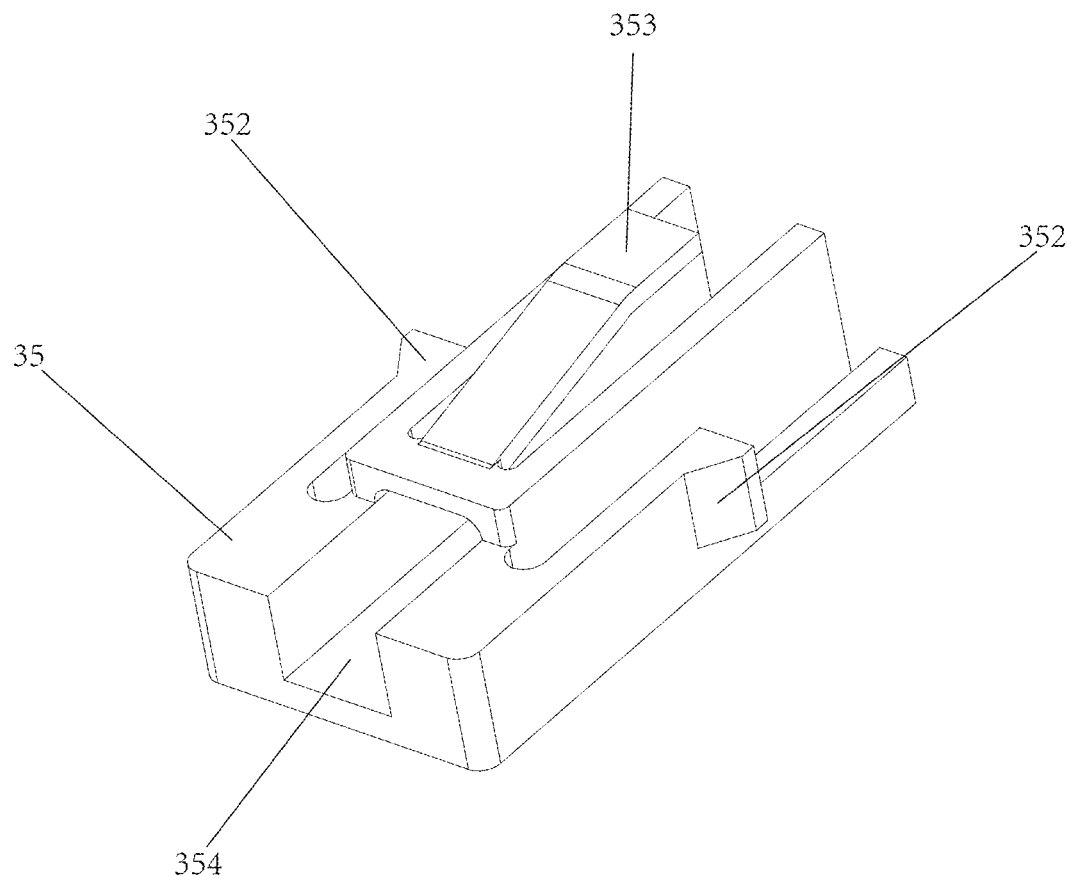
FIG. 7 is a first schematic structural diagram of an embodiment of a driver according to the present application.
Figure 8:
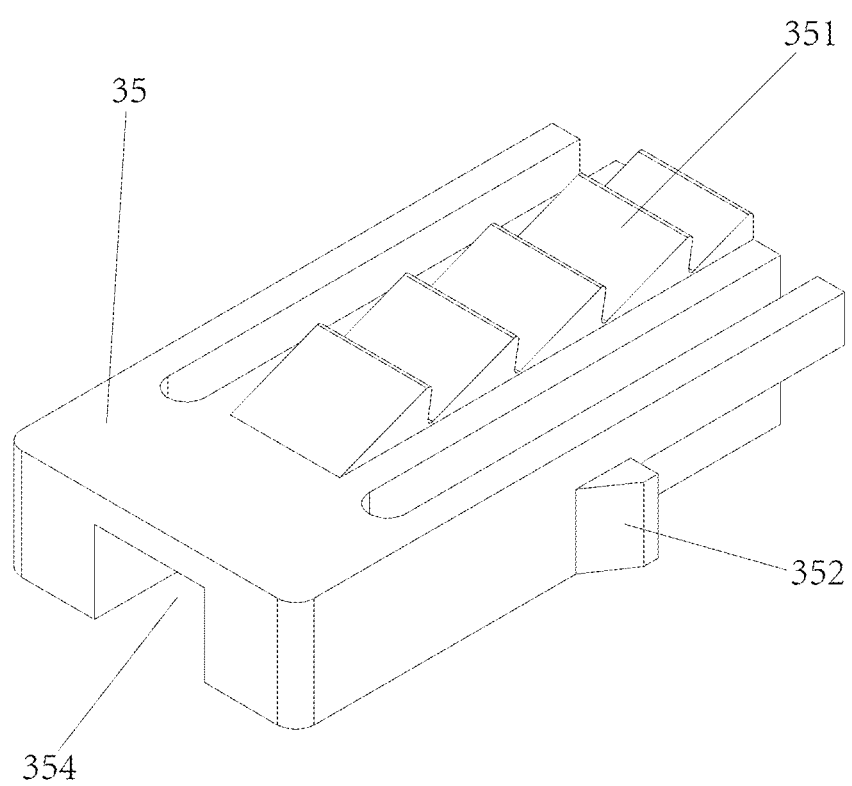
FIG. 8 is a second schematic structural diagram of an embodiment of the driver according to the present application.
Figure 13:
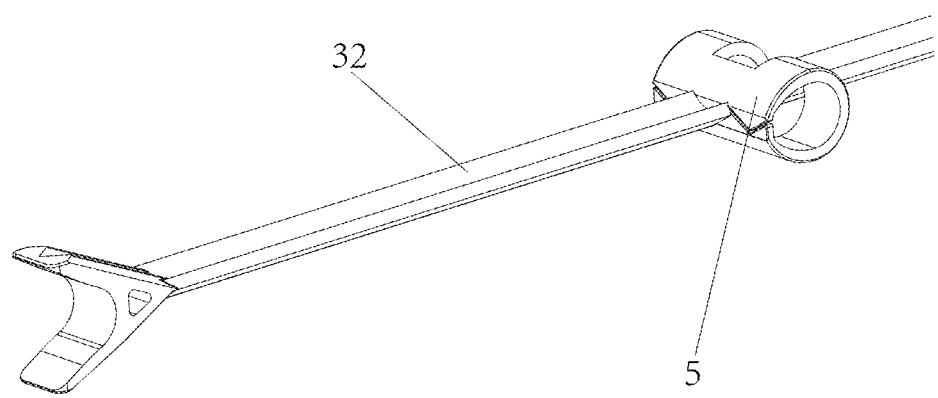
FIG. 13 is a first schematic diagram of matching state between the scalp clip and the guide rail according to the present application.
Figure 14:
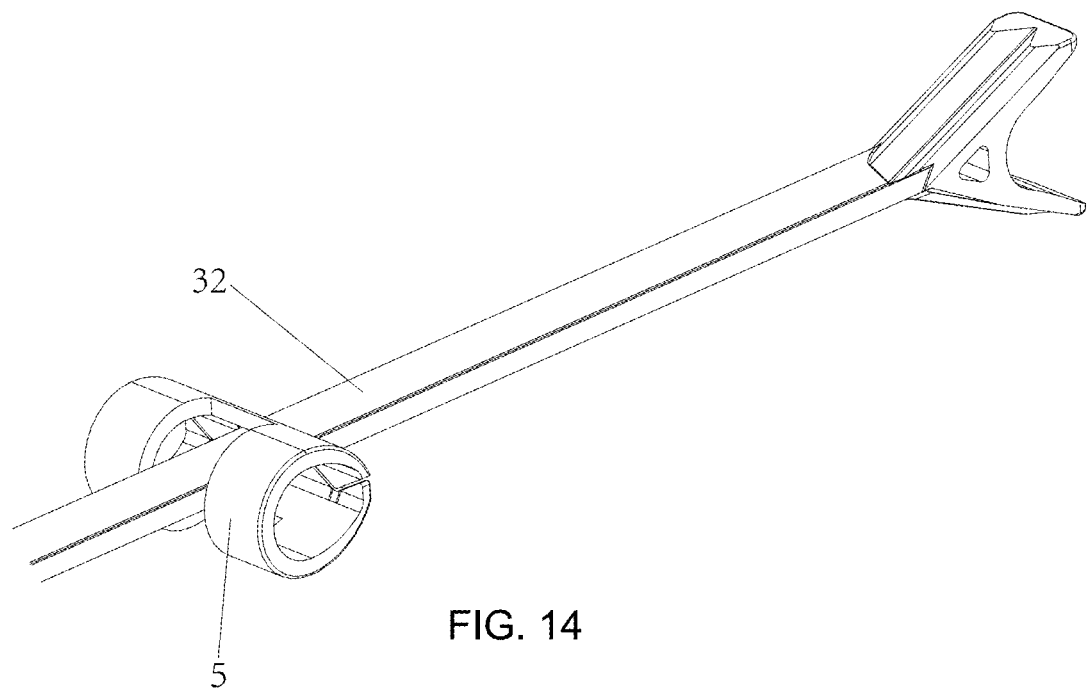
FIG. 14 is a second schematic diagram of matching state between the scalp clip and the guide rail according to the present application.
Figure 15:
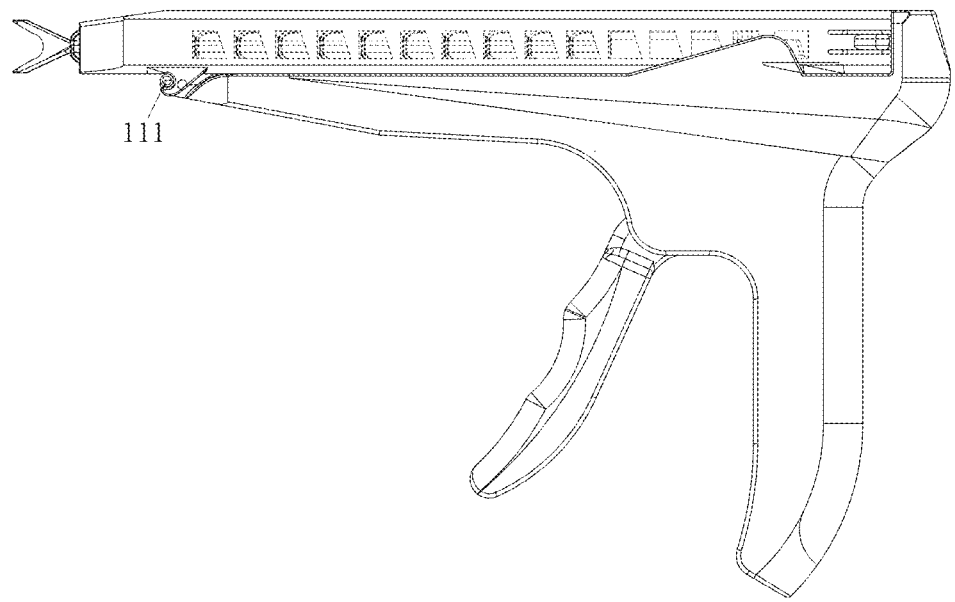
FIG. 15 is a second schematic diagram showing appearance an embodiment of the scalp clip gun according to the present application.

Preferably, as shown in FIGS. 5, 13 and 14, a first end of the guide rail 32 is provided with a bracing part 321, the bracing part 321 opens the scalp clips 5 that are pushed towards the first end of the guide rail 32 to facilitate subsequent clamping operations; a second end of the guide rail 32 is provided with a locking hole 322 (which may be a circular hole), a main body of the guide rail 32 is of a V-shaped structure, and the locking hole 322 cooperates with a locking column 423 (which may be a cylinder) of the locking mechanism to effect fixed connection of the second end of the guide rail 32. In the present application, a cross section of the main body portion of the guide rail 32 matches shapes of the open slots 51 of the scalp clips 5, which can be serrated or other shapes. Changes on the shape of the cross section of the main body portion of the guide rail 32 and the shapes of the open slots 51 of the scalp clips 5 shall be limited in the protection scope of the present application.

Preferably, as shown in FIGS. 5, 13 and 14, the bracing part is a "Y"-shaped structure, wherein one side is inclined upwardly or downwardly, so that when one of the scalp clips 5 is delivered to a position of the bracing part 321, the open slot 51 of one of the scalp clips 5 is pushed open by the "Y"-shaped structure.

Figure 9:
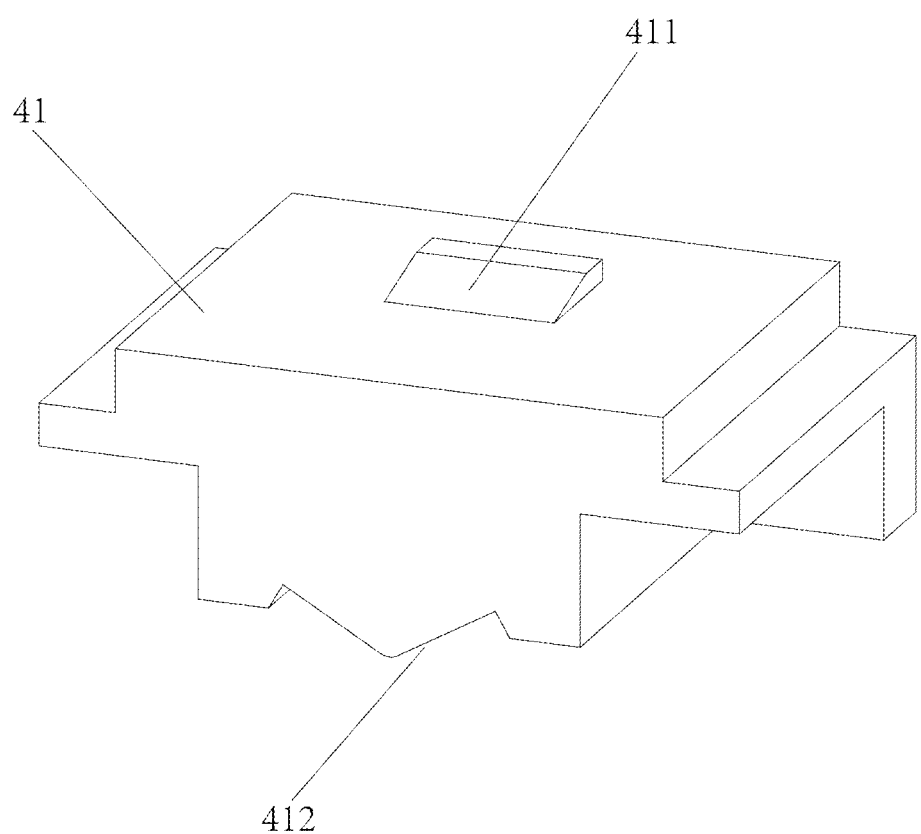
FIG. 9 is a schematic structural diagram of a first locking block according to an embodiment of the present application.
Figure 10:
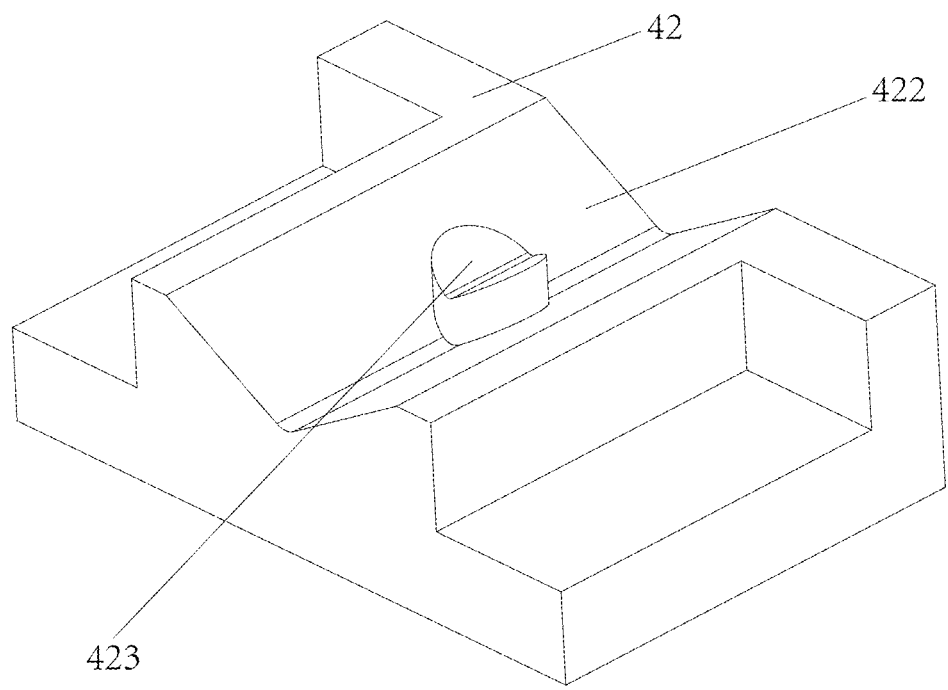
FIG. 10 is a first schematic structural diagram of a second locking block according to an embodiment of the present application.
Figure 11:
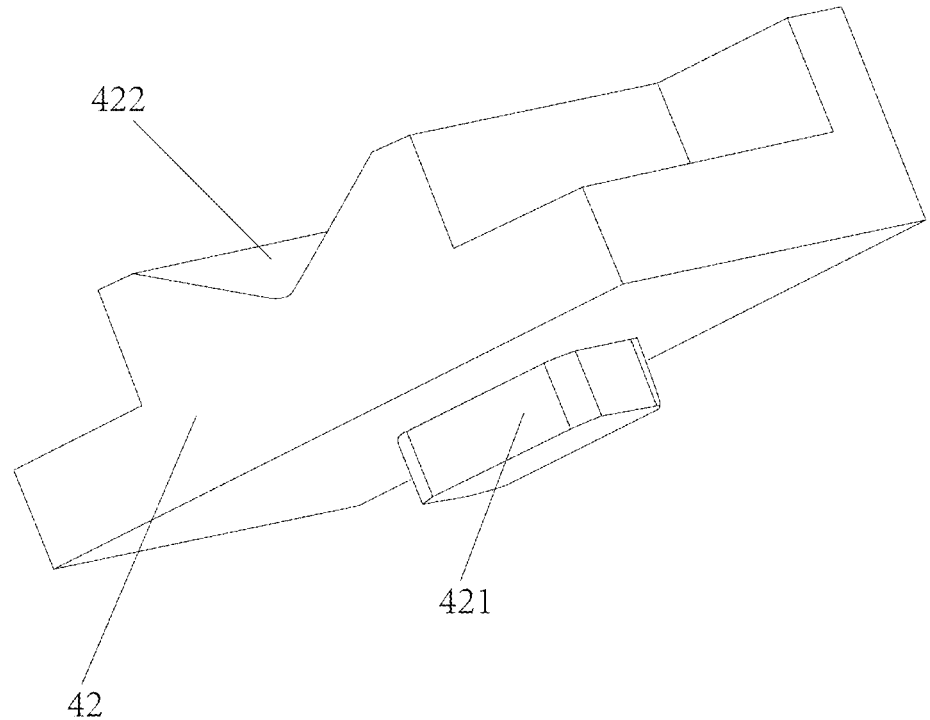
FIG. 11 is a second schematic structural diagram of the second locking block according to an embodiment of the present application.

Preferably, as shown in FIGS. 2, 9 and 11, the locking mechanism 4 comprises a first locking block 41 and a second locking block 42; an upper end of the first locking block 41 is provided with the first protrusion 411, and the first protrusion 411 is corresponds with the first groove 22 at the tail end of the magazine 2; the second protrusion 421 is arranged at a lower end of the second locking block 42, and the second protrusion 421 corresponds with the second groove 23 at the tail end of the magazine 2, so that the locking mechanism 4 is fixable with the second end of the magazine 2; and a V-shaped protrusion 412 is arranged at a lower end of the first locking block 41, a V-shaped groove 422 is arranged in an upper end of the second locking block 42, the V-shaped protrusion 412 is connectable to the V-shaped groove 412, the locking column 423 is arranged in the V-shaped groove 422, the locking column 423 is in locking connection with the locking hole 322 at the second end of the guide rail 32, which effects a fixed connection between the guide rail 32 and the locking mechanism 4.

Figure 12:
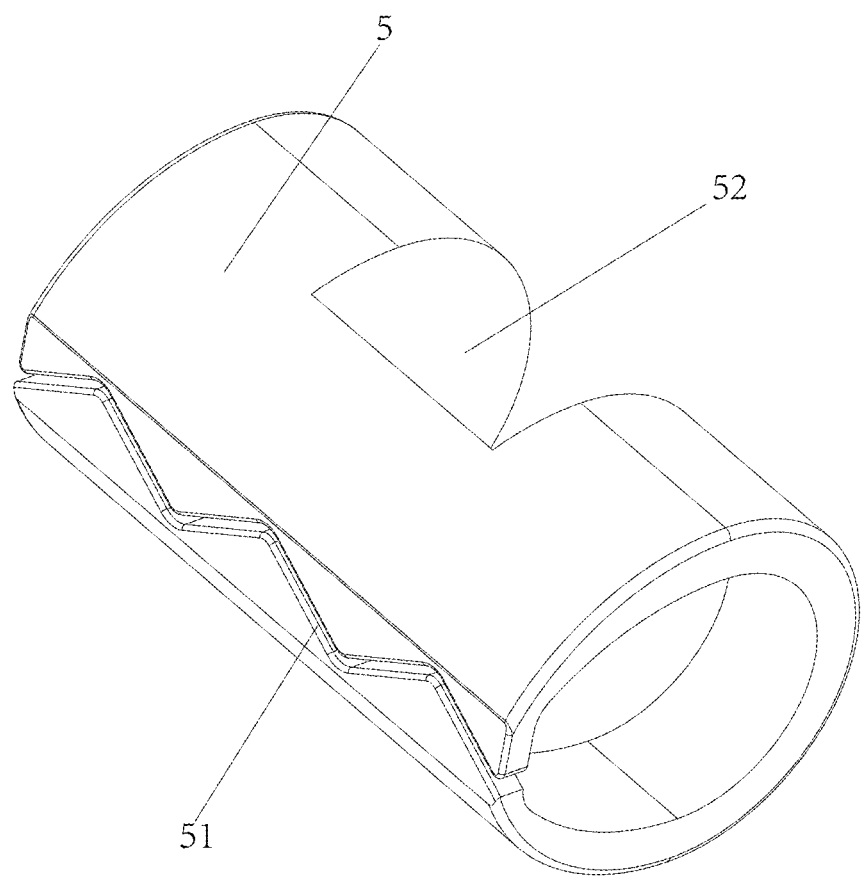
FIG. 12 is a schematic structural diagram of an embodiment of a scalp clip according to the present application.

Preferably, as shown in FIGS. 12 to 14, each of the scalp clips 5 is of an annular cantilever structure, one side of each of the scalp clips 5 is provided with the open slot 51 matched with shape of the cross section of the guide rail, a notch 52 is provided on another side of the scalp clip, and the guide rail 32 sequentially passes through the open slot 51 and the notch 52 but not in contact with the notch 52, so that the scalp clips 5 can slide on the guide rail 32.

Preferably, as shown in FIG. 2, a first end of the trigger 31 is a trigger head 311, a second thereof is a trigger tail 312, a pin shaft hole 115 is arranged on the first housing 11, the pin shaft is arranged in the pin shaft hole 115, the trigger 31 is rotatably fixed on the first housing 11 by a pin shaft arranged between the trigger head 311 and the trigger tail 312, and the trigger head 311 is inserted into the trigger buckle on the first housing 11.

Preferably, as shown in FIG. 2, the trigger buckle is an arc-shaped groove (which may be a U-shaped groove) provided with an opening, a first end of the trigger 31 is an arc-shaped protrusion, and pulling the trigger causes the arc-shaped protrusion slides into the arc-shaped groove.

Figure 3:
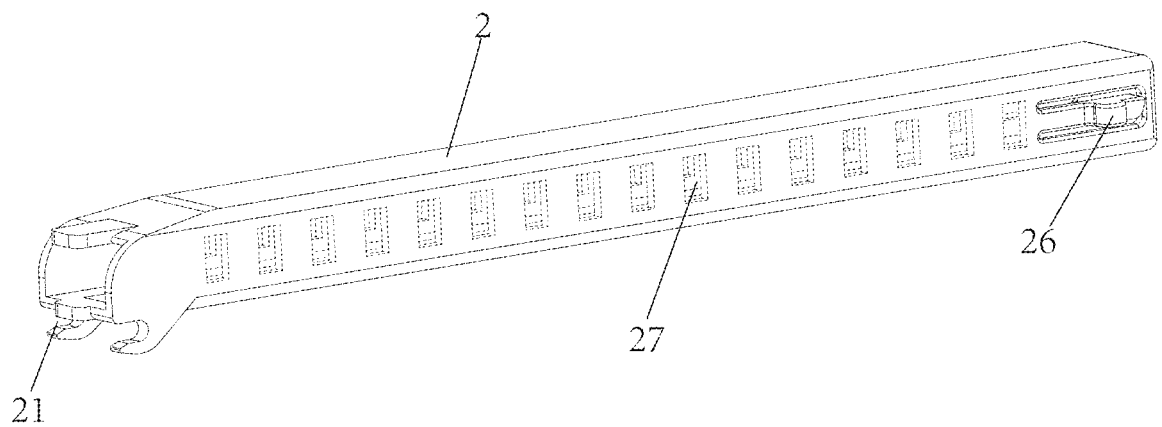
FIG. 3 is a first schematic structural diagram of an embodiment of a magazine according to the present application.
Figure 4:
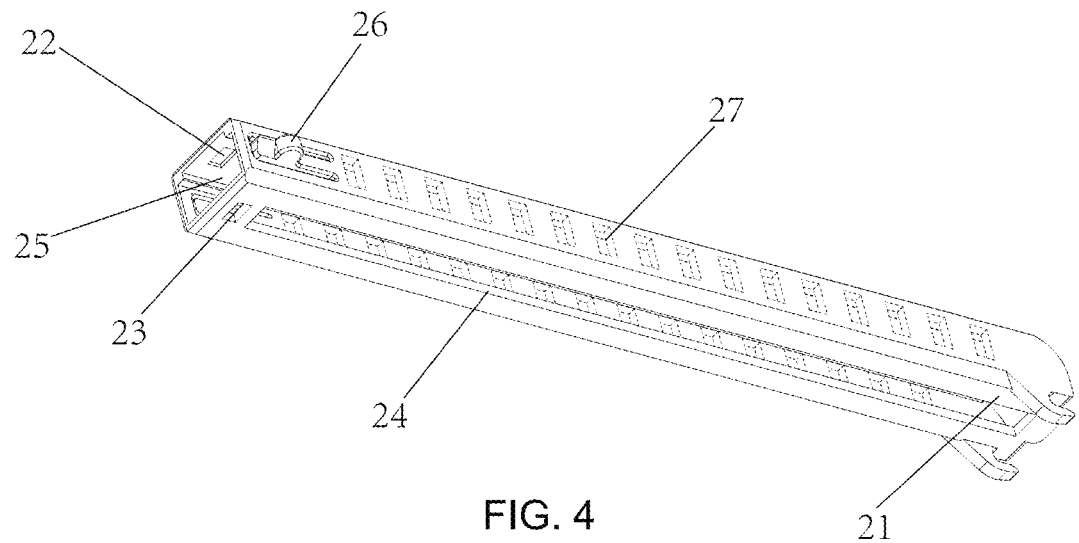
FIG. 4 is a second schematic structural diagram of an embodiment of the magazine according to the present application.

Preferably, as shown in FIG. 3, the positioning openings 27 on both sides of the magazine 2 are correspondingly arranged, wherein spacings between adjacent positioning openings 27 on the same side are equal, and each of the positioning openings 27 corresponds to each of the scalp clips 5 on the guide rail 32.

Use method of the scalp clip gun of the present application is as follows:

When the trigger 31 is pulled, the trigger 31 transmits the force to the trigger 31 and the transmission rack 34 through the rotating shaft, the transmission rack 34 moves horizontally and linearly, and the first transmission gears 343 of the transmission rack 34 cooperate with the second transmission gears 351 of the driver 35, so that the driver 35 moves forward. Due to limiting of the transmission rack 34, the stopping protrusions 352 of the driver 35 move forward by one grid (namely a positioning opening 27). At the same time, the scalp clips 5 also move forward for the same distance. Since the scalp clips 5 are cantilevers and move along the guide rail 32, when they move to the front bracing part 321 of the guide rail 32, namely the Y-shaped opening end, the scalp clips 5 are opened and kept at the Y-shaped opening end. When the trigger 31 is released, the transmission rack 34 moves horizontally rearward under action of the tension spring 33, and the driver 35 is locked to the current positioning openings 27 due to the stopping protrusions 352 of the driver 35, and due to special structure of the gears' shape, the driver 35 moves upward along the positioning openings 27, so that the first transmission gears 343 and the second transmission gears 351 are separated, and the transmission rack 34 is pulled back to the original position. At the same time, the driver 35 moves downward under action of the elastic piece 353, so that the first transmission gears 343 of the transmission rack 34 match the second transmission gears 351 of the driver 35. When the trigger 31 is pulled again, the driver 35 moves forward by a distance of one positioning opening, and the scalp clips 5 also move forward by the distance of one positioning opening. The scalp clips 5 previously positioned at the Y-shaped opening end of the guide rail 32 is pushed out of the Y-shaped opening end by this movement distance to stop the scalp bleeding. Meanwhile, the second scalp clip 5 is held at the position of Y-shaped opening and waits for next movement distance until clamped on the scalp. By repeating the above actions, all scalp clips 5 can be sent out in turn and delivered to working positions.

Although the present application has been described in detail above with general description and specific embodiments, on the basis of the present application, some modifications or improvements can be made thereto, which is obvious to those skilled in the art. Therefore, these modifications or improvements made without departing from spirit of the present application shall fall within the scope of protection of the present application.

The invention claimed is:
1. A scalp clip gun comprising a housing, a magazine, a propulsion mechanism, and a locking mechanism;
wherein a positioning protrusion is provided at a front end of the housing, a first end of the magazine is provided with a slot, the slot is cooperatively connected to the positioning protrusion, a positioning groove is provided at a rear end of the housing, a second end of the magazine is cooperatively connected with the positioning groove, the magazine is provided with an inner cavity that accommodates a plurality of scalp clips, both sides of the magazine are each provided with a latch, and a bottom portion is provided with an elongated slot; and the propulsion mechanism comprises a trigger, a guide rail, a tension spring, a transmission rack and a driver; the transmission rack is arranged in the housing and is slidable horizontally relative to the housing, the transmission rack is provided with first transmission gears, a trigger buckle and a rear protrusion, a first end of the trigger is rotatably arranged in the trigger buckle, the driver is arranged at a rear end of the transmission rack, a lower side of the driver is provided with second transmission gears, the first transmission gears engage with the second transmission gears, the guide rail is arranged in a through-hole of the driver, the driver moves forward relative to the guide rail, a left side and a right side of the driver are each provided with a stopping protrusion, the both sides of the magazine are provided with a plurality of positioning openings, each of the stopping protrusions are arranged to clamp and connect with the plurality of positioning openings at the magazine, a top portion of the driver is provided with an elastic piece, the elastic piece is used to reset the upwardly forced driver to a position that the transmission rack engages with the driver when the transmission rack moves horizontally rearward; a tail end of the guide rail is fixed by means of the locking mechanism, an upper side and a lower side of the locking mechanism are provided with a first protrusion and a second protrusion that are respectively clampable with a first groove and a second groove at a tail end of the magazine; a first end of the tension spring is connected with the rear protrusion, and a second end of the tension spring is connected with a mounting column in the housing; the plurality of scalp clips are slidingly arranged on the guide rail.

2. The scalp clip gun according to claim 1, wherein the housing comprises a first housing and a second housing, the first housing and the second housing are folded to form the housing, and the first housing and the second housing are structurally symmetrical.

3. The scalp clip gun according to claim 2, wherein a first positioning shaft hole and a second positioning shaft hole are provided in the first housing; a first positioning shaft mechanism is installed in the first positioning shaft hole, a second positioning shaft mechanism is installed in the second positioning shaft hole, the transmission rack is provided with a first guide groove and a second guide groove, the first positioning shaft mechanism is arranged in the first guide groove, and the second positioning shaft mechanism is arranged in the second guide groove, so that the transmission rack moves horizontally forward or rearward relative to the first housing.

4. The scalp clip gun according to claim 2, wherein a first end of the guide rail is provided with a bracing part, the bracing part opens the plurality of scalp clips that are pushed towards the first end of the guide rail to facilitate subsequent clamping operation; a second end of the guide rail is provided with a locking hole, a main body of the guide rail is of a V-shaped structure, and the locking hole cooperates with a locking column of the locking mechanism to effect fixed connection of the second end of the guide rail.

5. The scalp clip gun according to claim 4, wherein the bracing part is in a "Y"-shaped structure, wherein one side of the bracing part is inclined upwardly or downwardly.

6. The scalp clip gun according to claim 2, wherein the locking mechanism comprises a first locking block and a second locking block; an upper end of the first locking block is provided with the first protrusion, and the first protrusion corresponds with the first groove at the tail end of the magazine; the second protrusion is arranged at a lower end of the second locking block, and the second protrusion corresponds with the second groove at the tail end of the magazine, so that the locking mechanism is fixable with the second end of the magazine; and a V-shaped protrusion is arranged at a lower end of the first locking block, a V-shaped groove is arranged in an upper end of the second locking block, the V-shaped protrusion is connectable to the V-shaped groove, a locking column of the locking mechanism is arranged in the V-shaped groove, the locking column is in locking connection with a locking hole at the second end of the guide rail, to effect a fixed connection between the guide rail and the locking mechanism.

7. The scalp clip gun according to claim 2, wherein each of the plurality of scalp clips is of an annular cantilever structure, one side of each of the plurality of scalp clips is provided with an open slot matched with a shape of a cross section of the guide rail, a notch is provided on an opposite side, and the guide rail sequentially passes through the open slot and the notch but not in contact with the notch, so that the plurality of scalp clips are slidable on the guide rail.

8. The scalp clip gun according to claim 2, wherein the first end of the trigger is a trigger head, a second end of the trigger is a trigger tail, the trigger is rotatably fixed on the first housing by a pin shaft arranged between the trigger head and the trigger tail, and the trigger head is inserted into the trigger buckle on the first housing.

9. The scalp clip gun according to claim 2, wherein the trigger buckle is an arc-shaped groove provided with an opening, the first end of the trigger is an arc-shaped protrusion, and pulling the trigger causes the arc-shaped protrusion to slides into the arc-shaped groove.

10. The scalp clip gun according to claim 2, wherein the plurality of positioning openings on the both sides of the magazine are correspondingly arranged, wherein spacings between adjacent positioning openings of the plurality of positioning openings on a same side are equal, and each of the plurality of positioning openings corresponds to each of the plurality of scalp clips on the guide rail.

\* \* \* \* \*